May 25, 1965     F. D. WERNER     3,184,968
LEVEL INDICATOR
Filed May 23, 1962     2 Sheets-Sheet 1
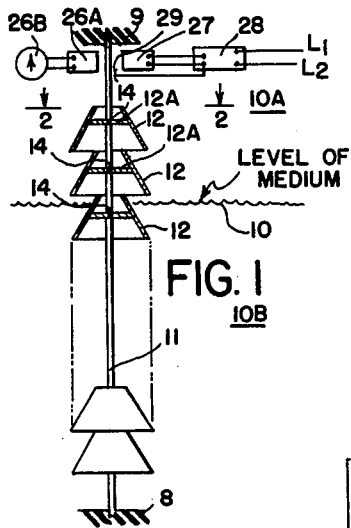
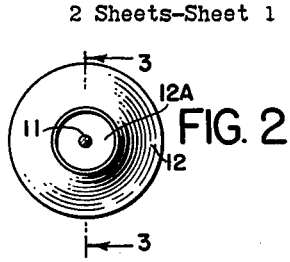
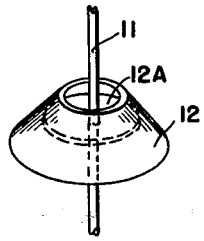
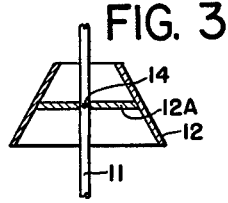
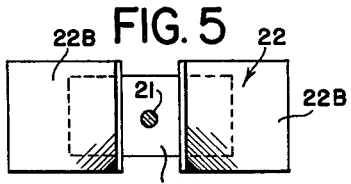
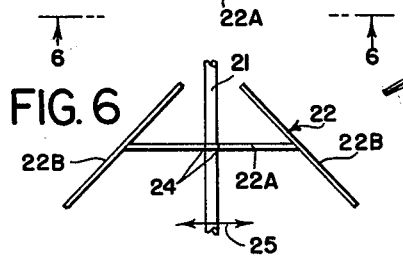
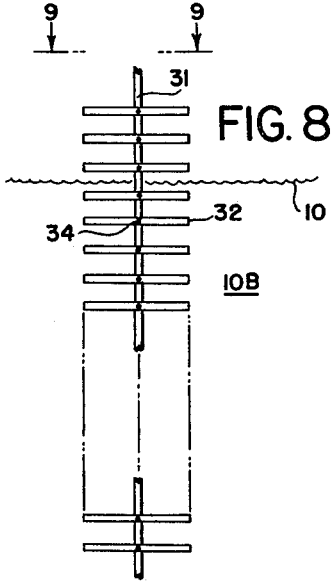
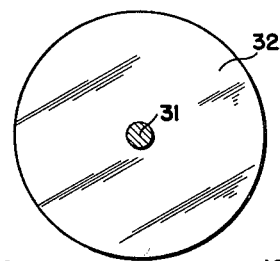
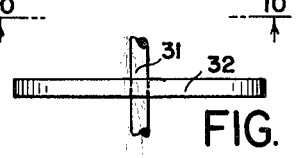
INVENTOR.
FRANK D. WERNER
BY Dugger & Johnson
ATTORNEYS

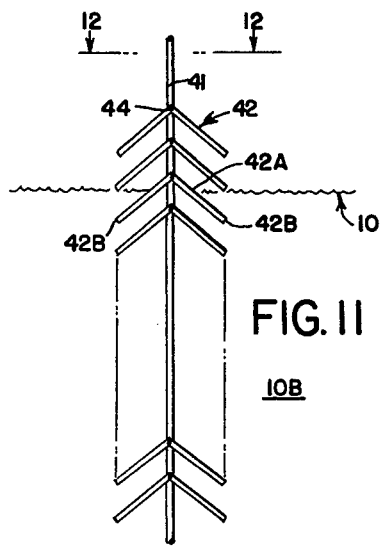
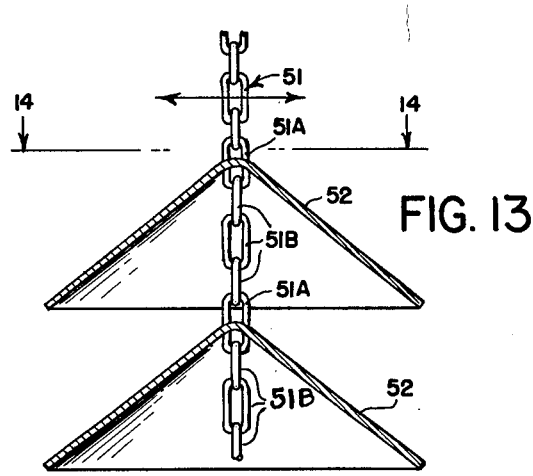
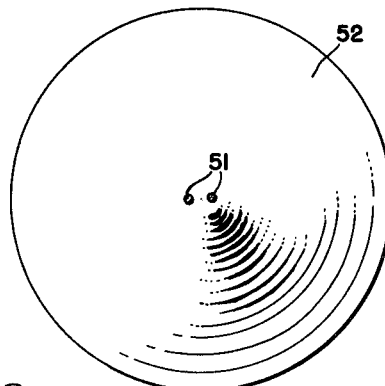
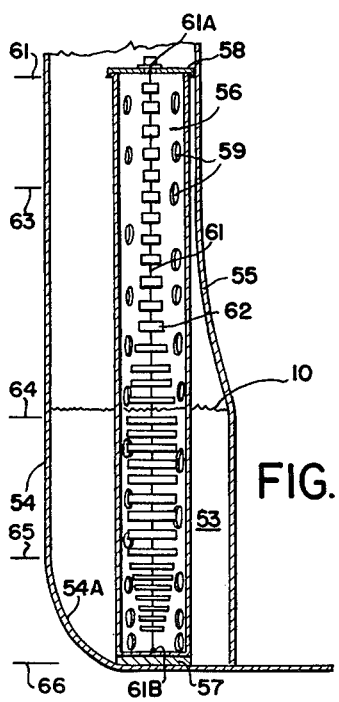
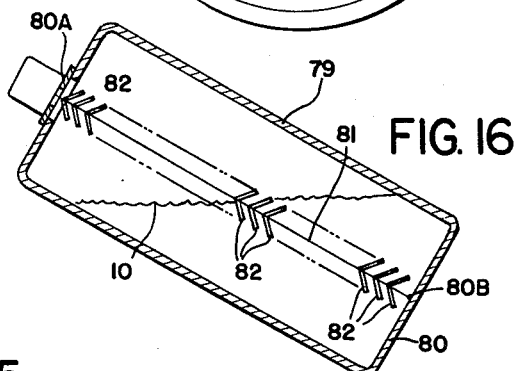

United States Patent Office 3,184,968
Patented May 25, 1965

3,184,968
LEVEL INDICATOR
Frank D. Werner, Minneapolis, Minn., assignor to Rosemount Engineering Company, Minneapolis, Minn., a corporation of Minnesota
Filed May 23, 1962, Ser. No. 197,013
6 Claims. (Cl. 73—290)

This invention relates to level indicators and particularly to those wherein the level sensor is a vibrator composed of a flexible bar, chain or strand mounted with or with without tension between end attachments and so as to extend in a direction having an upward component in a space wherein the level of a change-in-phase of material is to be sensed. In such devices, of which there are many known exemplifications, the vibrator is vibrated transversely, longitudinally or torsionally either by continuous vibrations or separate waves may be imposed on the vibrator. The period of vibration (i.e. wave length) of the vibrator is determined by, inter alia, the length of the vibrator which is (relatively) free to vibrate in the free fluid above the level of the change-in-phase. Exemplifications of change-in-phase are formed in tanks in which a solid or liquid material is contained with air or another gas above, or two fluids with the dense fluid at the bottom and the lighter fluid above.

In all level indicators of the aforesaid type, the lower (and denser) material, below the change-in-phase, serves to some extent to immobilize that portion of the vibrator below the level of the change-in-phase, and that portion of the length of the vibrator above the level of the change-in-phase therefore vibrates at a frequency determined by the length of that portion of the vibrator which is above such level.

If the material below the change-in-phase appreciable immobilizes the vibrator, the portion of the vibrator below the change-of-phase level will not vibrate appreciably or at all. In the case of many materials such as a flowable solid, i.e. grain, sand, etc., the vibrator is, for all intents, completely immobilized at and below the surface of such flowable solid. However, in the case of other materials, as where a liquid is contained in the space with gas above the change-in-phase level, some attenuated vibration may occur in the denser material below the change-in-phase, and the flexible strand will then vibrate at two primary frequencies and harmonically with attendant undesirable results.

It is a primary object of this invention to provide a level indicator of the aforesaid types having a vibrator on which a plurality of discrete elements of larger size than the vibrator element are positioned at intervals therealong. It is another object of the invention to provide a level indicator of the aforesaid types having a vibrator as a sensor, which vibrator has a plurality of discrete shaped objects attached at uniform intervals along the vibrator for engaging the material through which the vibrator extends. It is a further object of the invention to provide a level indicator of the aforesaid types having a plurality of elements attached at spaced intervals along the vibrator, said elements being varied in mass (i.e. weight) in accordance with the variations in cross-sectonal area of the vessel through which the vibrator extends. It is a further object of this invention to provide a level indicator of the aforesaid types having a plurality of enlargements at uniform intervals throughout the effective length of the vibrator. It is a further object of the invention to provide a level indicator of the aforesaid type having an elongated vibrator extending along a line which is at an angle between horizontal and vertical.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURES 1–4 illustrate an exemplary embodiment of the invention, and in which FIGURE 1 is a side-elevational view, partly in section of said embodiment; FIGURE 2 is a horizontal sectional view taken along the line and in the direction of arrows 2—2 of FIGURE 1; FIGURE 3 is a vertical sectional view taken along the line and in the direction of arrows 3—3 of FIGURE 2; and FIGURE 4 is a perspective view of the vibrator shown in FIGURE 1, and one element mounted thereon.

FIGURES 5, 6 and 7 illustrate another embodiment of the invention, FIGURE 5 being a horizonal sectional view through the vibrator and the element mounted thereon. This view corresponds to the view shown in FIGURE 2. FIGURE 6 is a side elevational view taken along the line and in the direction of arrows 6—6 of FIGURE 5. FIGURE 7 is a perspective view of the vibrator and illustrating one of the elements of the type shown in FIGURES 5 and 6 mounted thereon.

FIGURES 8, 9 and 10 illustrate a further embodiment of the invention, FIGURE 8 being a side elevational view, FIGURE 9 a transverse sectional view taken along the line and in the direction of arrows 9—9 of FIGURE 8, and FIGURE 10 a side elevational of the elements shown in FIGURE 9, taken along the line and in the direction of arrows 10—10 of FIGURE 9.

FIGURES 11 and 12 illustrate a further embodiment of the invention, FIGURE 11 being a side elevational view and FIGURE 12 being a transverse sectional view taken along the line and in the direction of arrows 12—12 of FIGURE 11.

FIGURES 13 and 14 illustrate another modification of the invention. FIGURE 12 is a side elevational view partly in section and FIGURE 14 is a transverse sectional view taken along the line and in the direction of arrows 14—14 of FIGURE 13.

FIGURE 15 illustrates further embodiments of the invention, said view being a vertical sectional view, partly in elevation.

FIGURE 16 is another modification of the invention, being a vertical sectional view, partly in elevation.

Throughout the drawings, corresponding numerals refer to the same parts.

According to the present invention, the vibrator may be any elongated object such as a slim bar, a wire or cable, a chain or a strand. Any of these, when suitably mounted, will be capable of being vibrated by single or sustained vibrations of transverse, torsional or longitudinal nature. Concerning the kinds of vibrators, FIGURES 1–8 exemplify vibrators composed of a slim bar; FIGURES 13 and 14 exemplify vibrators composed of chain, and FIGURES 15 and 16 exemplify vibrators composed of a strand of material such as a wire or cable. Therefore, it is to be understood that the invention is applicable to various kinds of vibrators.

The kind of vibrations used is determined, to some extent, by the kind of vibrator used. Slim bars such as shown in FIGURES 1–8 may be arranged so as to vibrate transversely, longitudinally or torsionally. Strands, such as shown in FIGURES 13 and 14 may readily be vibrated transversely and longitudinally, but they are less adapted to torsional vibration. In the case of a chain, transverse vibrations are preferred. It is therefore to be understood that according to this invention various kinds of vibrations, i.e. transverse, longitudinal or torsional may be used, and that a mode of vibration is selected which is suited to the configuration and mounting of the vibrator being used.

The form of mountings are selected according to the type of vibrator and mode of vibration selected. For example, when a self sustaining slim bar is used as the vibrator, tension is not required to sustain the configuration of the bar, and the end mountings which may then be used need only position the vibrator without deleterious restraint which would impair the vibrations induced in the bar. In some instances, as for example in a quiet location, only one end mounting may be used, such as a simple suspension for the bar at its upper end. Rubber grommets or cups serve well as end mountings for slim bar vibrators, in that they provide positioning, and impose no deleterious restraint.

Where the vibrator is a strand or chain, at least one mounting, i.e. the upper one, is required so as at least to orient the vibrator strand to provide free suspension of the strand by its upper end, and when tension is required or desired, this may be provided by a lower mounting or weight to which the vibrator is attached. The amount of tension in the strand may be varied. Where, pursuant this invention, the vibrator is a tensioned non-vertical strand, upper and lower mountings are of course required to maintain the stretched non-vertical configuration.

Level sensors of this general character may be subjected to sustained vibrations, and the rate of vibration is then determined inter alia, by that portion of the strand which is above the change-of-phase 10 of material in the space wherein the level is sensed.

In FIGURES 1–4, the vibrator is illustrated as a slim bar supported by rubber (or other flexible) mountings 8 (bottom) and 9 (top). The bar 11 is not tensioned in FIGURES 1–4.

According to this invention, at uniform intervals along the vibrator there are provided a plurality of discrete elements of larger size than the vibrator 11, and these are here illustrated as frustoconical cups 12—12, which are each provided on their interior with a transverse surface 12A by which they are permanently fastened to the bar 11 by means of a pin 14 or other suitable fastening. Each of the frustoconical elements 12 is identical with all others that are fastened to the bar 11 and they are positioned at equal intervals on the bar. The bar 11 is flexible and is capable of vibration. The period of vibration of the bar once it is set into the vibration is determined by the length of the bar which is above the change-in-phase level 10. The material in the space 10B below the change-in-phase 10 is denser than the material in the space 10A above the change-in-phase 10. Thus, the material 10B may be a liquid or a solid such as grain or sand which is capable of flowing, and the material in the space 10A may be a gas or a liquid. In some instances, the materials 10A and 10B will both be liquids, with the denser liquid 10B at the bottom.

The effect of the elements 12 upon a flexible bar 11 is to increase the resistance of the bar to vibration throughout that portion of the bar which is below the level 10 of change-in-phase. Thus, considering the material 10B is a liquid, the frustoconical element 12 which is partially submerged, as shown in FIGURE 10, and all such elements below that element, serve substantially to anchor the bar 11 from vibration, either transversely or rotationally, or axially of the bar, depending upon the kind of vibration imposed thereon. That portion of the bar 11 which is above the change-in-phase level 10 is free to vibrate at a period which is determined by the length of bar above said change-in-phase level 10 to the top anchorage. As the change-in-phase level thus varies, the rate of vibration of the bar will vary, and hence the bar senses changes in level. It will be noted that the frustoconical elements 12 are positioned along the bar so that the top of one frustoconical element will be at substantially the same position as the bottom of the next higher frustoconical element. Accordingly, the bottom edge of one frustoconical will just begin to engage the material 10B below one level at the change-of-phase 10 as the top of the next such element below begins to be submerged. Accordingly, the elements serve very accurately to indicate differences in the level 10.

Mechanisms for imposing vibrations on the strand 11 and for sensing the frequency of such vibration are illustrated in various prior patents. Thus, mechanisms as shown in Patent No. 2,472,249 may be utilized for vibrating the vibrator and sensing the period of vibration where a transverse vibration is desired. The mechanism such as shown in Patent No. 2,709,918 may be utilized where it is desired to impose a longitudinal vibration on the vibrator, and to sense the vibration thereof. In the present instance in the illustration in FIGURE 1, a vibrator 28 controlled by feedback 29 and supplied by power from lines L1 and L2 imposes transverse vibration on the bar, and the rate of vibration is sensed by pickup 26A and indicated at 26. Any form of known mechanism may be utilized for imposing vibrations on the vibrator, and for sensing the rate of vibration. Accordingly, it will be understood that the present invention utilizes a mechanism for imposing a vibration on a vibrator element and for sensing and indicating the period of such vibration.

It may also be stated that the vibration may be continuous or discontinuous. Thus, in some instances it is desirable merely to impose (periodically) a single wave vibration on the vibrator, and when so imposed, the vibration will travel down to the level 10 of the change-in-phase, and then be reflected back. In such instance, the time period from the instant the vibration is imposed on the vibrator, until it is received back is the indication of the level, desired to be read. The time for reflection of such vibration, where discontinuous vibrations are utilized, is determined by the natural period of vibration of that part of the vibrator which is above the level 10 (i.e. the wave length). It will be therefore understood that either the continuous vibration or the discontinuous vibration with suitable sensor and indicating instruments are utilized as desired with the vibrator in the present invention.

In FIGURES 5, 6 and 7 there are illustrated a modified form of the invention, wherein the said vibrator 21 is provided with a plurality of devices 22 at spaced intervals thereon. Each of these devices comprises a plate 22A which is fastened by pins, crimping or other suitable fastenings 24 to the vibrator 21. The support plate 22A terminates and is fastened to downwardly slanting flat plates 22B at either end, and each of the elements 22 thus provides surfaces 22B which can readily engage upon and be restrained from movement by the denser material below the change-in-phase level 10. The form of element shown in FIG. 7 is normally used where transverse vibration of the member 21 in the direction of the double arrow 25 is utilized. It will be understood that a plurality of such elements 22 are fastened to the vibrator 21 at uniformly spaced intervals along the vibrator in the manner shown in FIGURE 1.

In FIGURES 8, 9 and 10 there is illustrated another exemplary form of the invention, wherein the vibrator 31 is provided at uniformly spaced intervals therealong with discs 32 which are fastened at 34 to the vibrator by means of pins or other suitable fastenings which do substantially impair the flexibility of the vibrator. The discs 32 present to the material 10B below the change-of-phase level 10 a large surface which is in contact with such material 10B and serve substantially to restrain that portion of the vibrator 31 which is below the change-in-phase level 10. The form of invention shown in FIGURES 8, 9 and 10 is best adapted to sensors wherein torsional or longitudinal vibrations are imposed on the vibrator, but it is not intended that transverse type vibrations are wholly unsuited in this illustration.

In FIGURES 11 and 12 there are illustrated another form of the invention wherein the vibrator 41 is provided with a plurality of V-shaped elements 42 which are each pinned or otherwise attached to the vibrator by means of a fastening 44. These elements 42 can be of rectangular configuration when viewed in plan, as shown in FIGURE 12. They are set (at even intervals) along the length of the vibrator and do not substantially impair the flexibility of the vibrator. It will be observed that the elements 42 are bent into a V-shape and positioned on the vibrator so that the lower tip 42B of one element will be engaged by the material 10B below the change-in-phase level 10 before the point 42A of the element next below is submerged. The elements 42 are accordingly slightly overlapped and therefore for every position of the change-in-phase level 10, at least some portions of two elements will be engaged by the material 10B below the change-in-phase level. It may be stated parenthetically that such overlapping of the elements may be utilized in locating any of the forms of elements illustrated herein in FIGURES 1–4, FIGURES 6–7, FIGURES 11 and 12, and FIGURES 13–14.

In FIGURES 13 and 14 there is illustrated another exemplary form of the invention utilizing conical elements 52 which are spaced at uniform intervals along the vibrator, which in this illustration consists of a chain 51. For ease of fastening, a link 51A of the chain is inserted through the element 52 and brazed or otherwise fastened. Then several links 51B are then connected below the element 52 and joined to the next link 51A on element 52 next therebelow. The provision of a uniform member of links 51B between elements 52 provides uniform spacing of the elements along the completed vibrator 51. The elements 52 provide a large area for engaging the material in the space 10B below the change-in-phase level 10 at every level to which the vibrator strand 51 is submerged.

In FIGURE 15 there is illustrated a form of the invention which may be utilized for containers wherein the cross-sectional area of the container varies at different heights, as in the oil storage bunkers located in the hull of a ship and similar odd-shaped places. Thus, in FIGURE 15 the ship may have an outer skin 54 and an inner skin 55 providing a space 56 therebetween forming a bunker or oil storage compartment 53 of the ship in which fuel oil, water or other liquid may be stored for use on the ship. This space 53 varies in cross-section, being larger from levels 63 to 64 than at the top and bottom. In the space 53 there is placed a tube 56 which is fastened at the bottom to the pad 57 and at the top to a bracket 58 so that the tube is vertical in said space 53. The tube 56 has a plurality of small openings 59 throughout its vertical height so that liquid from the space 53 may freely enter into the tube, but the liquid within the tube 56 will not be unduly agitated due to surging and splashing in the space 53.

Within the tube 56 there is positioned a vibrator strand herein illustrated as a wire 61 which is fastened at the lower fastening 61B and at the upper fastening 61A in such a way as to maintain the wire under tension. It may be stated parenthetically that the fastening 61B can be of the type shown in patents aforementioned and that the strand 61 may accordingly be subjected to transverse, longitudinal or rotational vibrations as desired, transverse or longitudinal vibrations being preferred since the vibrator is a wire. Along the vibrator 61, at uniform intervals there are attached elements 62. In this instance, while the elements 62 are uniformly spaced, but they could be spaced at various distances. In this illustration the size (mass) as a function of the cross-sectional area of the space 53 wherein they are located. The objective is to provide a loading along strand 61 which is varied so as to provide a mass per unit of length (i.e. height) of strand 61 which is proportional to the volume per unit of height for the bunker 53. In this illustration, the variations in mass per unit of length (height) of the strand is achieved by using blocks 62 of material of generally uniform thickness and various areas and these are preferably made as discs. However, the variations in mass per unit of length can also be obtained by making discs uniform in size and varying their load or by making discs of uniform size and varying their thickness. Any of these expedients can be used. Thus, from the upper level 61 to about the level 62, the cross-sectional area of the space 53 remains constant and the elements 62 fasten to the vibrator strand 61 throughout this portion of the strand and are of uniform mass. From the level 63 to the level 64, the wall 55 of the space 53 gradually increases, thereby gradually increasing the cross-sectional area, and the elements 62 fastened to the vibrator strand 61 are accordingly gradually increased in mass (also size) to a maximum size at level 64. From the level 64 to the level 65, the cross-sectional area of the space remains substantially constant, and the elements 62 throughout this space are of the same mass (size). From the level 64 to the level 65, the space 53 decreases in cross-sectional area due to the inward curve 54A of the outer skin of the ship and the elements below level 64 are gradually decreased in mass (size). As a result of the change in mass (size) of the elements 62 on the vibrator 61, the rate of wave propagation along the vibrator 61 varies as a function of the cross-sectional area of the space in which the vibrator is located and the time for propagation of a wave downward to level 10 and for return of the wave is in effect an integration of the cross-sectional areas, and hence volume.

In FIGURE 16 there is illustrated one mode of utilizing the invention which may be used when the container, generally designated 79, is not vertical. In such mode of utilization, there is provided a vibrator 81, here illustrated as a flexible strand under tension, which is anchored at 80B to the bottom of 80 of the tank and anchored at the top fixture 80A at the top of the tank. The fixture 80A may be illustrated in either of the patents aforementioned, or as shown in the art and provides the necessary vibratory and sensing apparatus for sensing the vibration (or the time duration of the reflective signal) as is well known. The vibrator 81 is provided in this instance with a plurality of elements 82 therealong, which may be shaped in accordance with any of the embodiments herein illustrated. The vibrator strand 81 accordingly does not need to be vertical, but may be at an angle between horizontal and vertical.

According to this invention, the vibrator may be of circular cross-section or rectangular cross-section and a plurality of strands may be employed, as in my copending application entitled "Level Sensor" executed of even date herewith.

As many widely apparently different embodiments of this invention may be made without departing from the spirit and scope thereof, it is to be understood that I do not limit myself to the specific embodiments herein.

What I claim is:

1. A level indicator comprising an elongated vibrator, anchorage means for the vibrator for supporting it in the space wherein changes in level of a change-in-phase of material in said space is to be indicated, means for imposing a vibration on said vibrator, means responsive to said vibration for indicating said level, said vibrator having discrete elements attached to it at intervals therealong, said elements being shells open at the top and bottom and having outwardly and downwardly sloping outer and inner surfaces.

2. The level indicator of claim 1 further characterized in that said elements are of uniform configuration.

3. The level indicator of claim 1 further characterized in that said elements are of a size which varies as a function of the cross-sectional area of the space through which the vibrator extends.

4. The level indicator of claim 1 further characterized in that said vibrator extends in a direction which is between horizontal and vertical.

5. The level indicator of claim 1 further characterized in that said elements are circular.

6. The level indicator of claim 1 further characterized in that said elements are circular frustoconical shells mounted with their axes generally coincident with the longitudinal axis of the vibrator.

References Cited by the Examiner

UNITED STATES PATENTS

| 2,472,249 | 6/49 | De Giers et al. | 773—290 |
| 2,998,723 | 9/61 | Smith et al. | 73—290 |
| 3,010,318 | 11/61 | Morgan | 73—290 |

ISAAC LISANN, *Primary Examiner.*

ROBERT EVANS, *Examiner.*